United States Patent Office 3,506,648
Patented Apr. 14, 1970

3,506,648
DIALKYLAMINOALKYL ESTRONE OXIME DERIVATIVES
Wataru Nagata, Nishinomiya-shi, Japan, assignor to Shionogi & Co., Ltd., Osaka, Japan
No Drawing. Continuation-in-part of application Ser. No. 739,932, June 4, 1968. This application Nov. 6, 1968, Ser. No. 773,942
Claims priority, application Japan, June 18, 1964, 39/34,534
Int. Cl. C07c *169/02*
U.S. Cl. 260—239.5     23 Claims

ABSTRACT OF THE DISCLOSURE

Compounds of the formula

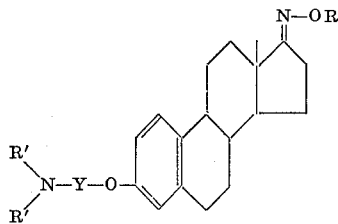

wherein each R' independently stands for methyl or ethyl, or

stands for pyrrolidino, piperidino or morpholino, Y is —CH$_2$CH$_2$— or —CH$_2$—CH$_2$—CH$_2$—, and R is H or the group

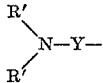

wherein R' and Y are as precedingly defined, and pharmaceutically effective acid addition salts thereof, possess hypocholesterolemic and urotropic activities on oral or parenteral administration.

---

This application is a continuation-in-part of copending application Ser. No. 739,932, filed June 4, 1968, now abandoned, which is in turn a continuation application of application Ser. No. 463,337, filed June 11, 1965, now abandoned.

This invention relates to novel physiologically active compounds; especially it concerns mono- and bis-tert-aminoalkyl derivatives of estrone oxime and the preparation thereof.

The compounds of the present invention are represented by the formula:

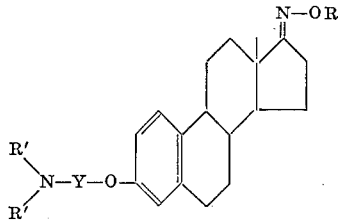

wherein each R' independently represents a member selected from the group consisting of methyl and methyl or

represents a heterocyclic group such as pyrrolidino piperidino or morpholino, Y represents a member selected from the group consisting of ethylene and trimethylene, and R represents a hydrogen atom or the group:

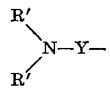

wherein R' and Y represent respectively the same significances as defined above.

The compounds of the invention possess significant pharmacological properties when administered orally or parenterally at well tolerated dose levels in vivo as demonstrated in standard assay tests. Especially, they can be used, as such or in the form of pharmaceutically acceptable acid addition salts, as medicaments having hyperchlosterolemia inhibition and potent uterotropic activities. Moreover, they possess antimicrobial activity, especially against *Mycobacterium tuberculosis* and/or *Bacillus subtilis;* therefore, they can also be used as antimicrobials.

The compounds of the invention are produced by condensing estrone oxime of the formula:

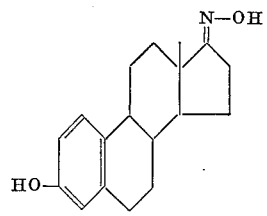

with a compound of the formula

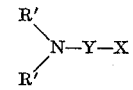

wherein R' and Y represent respectively the same significances as defined above, and X represents a halogen atom or a group represented by the Formula IV:

—OSO$_2$Z       (IV)

wherein Z represents methyl, phenyl, tolyl or bromophenyl, in the presence of a base followed by treatment with pharmaceutically acceptable acid on need.

Practical examples of the compound of the Formula III used in the present invention are: dimethylaminoethyl bromide, dimethylaminoethyl iodide, dimethylaminoethyl methanesulfonate, dimethylaminoethyl p-toluenesulfonate, dimethylaminopropyl chloride, diethyl aminoethylbromide, morpholinoethyl bromide, piperidinoethyl chloride, piperidinopropyl bromide, pyrrolidinoethyl chloride, diethylaminopropyl iodide and morpholinopropyl bromide. They are used in the reaction both in free form or in salt form with conventional organic and inorganic acids. When using the salt form, however, it is usually required to add the equivalent amount of base, for which purpose excess amount of base as condensing agent usually serves, to convert the aforesaid compound to reactive form.

Condensation of the compound (II) with (III) can be carried out by a procedure corresponding substantially to the so-called Williamson synthesis or related methods. Favorable results are obtainable especially by the following general procedure. Thus, the starting estrone oxime (I) is first dissolved in an anhydrous or aqueous organic solvent, then a base such as an hydroxide, hydride, alkoxide or carbonate of an alkali metal is added (whereby the 3-hydroxyl and/or 17-hydroxyimino are partly or fully replaced by the alkali metal from the base used) and, finally, the compound (III) is added little by little to the mixture during the reaction period, under warming or heating on need. As solvent in this reaction, acetone, dioxane, benzene or the like can be used, but an alcohol is preferable as solvent owing to its favorable polarity compared with the hydroxyimino and phenolic hydroxy of the compound (II). The compound (III), when X is a sulfonic acid residue or iodine atom, is sufficiently reactive for carrying out the reaction without heating. However, when X is chlorine or bromine, its reactivity is significantly low without heating and/or a long reaction period. Sometimes, some catalysts such as an iodide, a copper salt and copper powder may serve to promote the reaction velocity. In general, excess amount (more than 2 moles) of the base conducts the reaction to a bis-tert.-aminoalkyl derivative (I, R is same as 3-substituent) and contrariwise, insufficiency of the base produces a mono-tert.-aminoalkyl derivative (I, R=H).

Specific examples of the product are:

3-(2-dimethylaminoethoxy)-17-(2-dimethylaminoethoxy) imino-1,3,5(10)-estratriene,
3-(2-dimethylaminoethoxy)-17-hydroxyimino-1,3,5(10)-estratriene,
3-(3-dimethylaminopropoxy)-17-(3-dimethylaminopropoxy)imino-1,3,5(10)-estratriene,
3-(3-dimethylaminopropoxy)-17-hydroxyimino-1,3,5(10)-estratriene,
3-(2-diethylaminoethoxy)-17-(2-diethylaminoethoxy) imino-1,3,5(10)-estratriene,
3-(2-diethylaminoethoxy)-17-hydroxyimino-1,3,5(10)-estratriene,
3-(2-morpholinoethoxy)-17-(2-morpholinoethoxy)imino-1,3,5(10)-estratriene,
3-(2-morpholinoethoxy)-17-hydroxyimino-1,3,5(10)-estratriene,
3-(2-piperidinoethoxy)-17-(2-piperidinoethoxy)imino-1,3,5(10)-estratriene,
3-(2-piperidinoethoxy)-17-hydroxyimino-1,3,5(10)-estratriene,
3-(3-piperidinopropoxy)-17-(3-piperidinopropoxy)imino-1,3,5(10)-estratriene,
3-(3-piperidinopropoxy)-17-hydroxyimino-1,3,5(10)-estratriene,
3-(2-pyrrolidinoethoxy)-17-(2-pyrrolidinoethoxy)imino-1,3,5(10)-estratriene,
3-(2-pyrrolidinoethoxy)-17-hydroxyimino-1,3,5(10)-estratriene,
3-(3-diethylaminopropoxy)-17-(3-diethylaminopropoxy)-1,3,5(10)-estratriene,
3-(3-diethylaminopropoxy)-17-hydroxyimino-1,3,5(10)-estratriene,
3-(3-morpholinopropoxy)-17-(3-morpholinopropoxy) imino-1,3,5(10)-estratriene and
3-(3-morpholinopropoxy)-17-hydroxyimino-1,3,5(10)-estratriene.

The compounds of the invention, especially the bis-tert.-aminoalkyl derivatives (I, R is the same as 3-substituent), are pharmacologically active as mentioned above, whereas the many known dialkylaminoalkoxy steroids are practically inactive, as confirmed by recent reinvestigations. For example, 3-(2-dimethylaminoethoxy)-17-(2-dimethylaminoethoxy)imino-1,3,5(10)-estratriene oxalate decreased total plasma cholesterol content, phospholipid level and the ratio thereof (C/P) respectively to —40, —17 and —28%, whereas 17-(2-dimethylaminoethoxy)imino-5α-androstan-3β-ol decreased the same values only slightly (respectively to —10, —5 and —5%), by oral administration on rats weighing about 120 g. at dosage of 5 mg. per body for 10 days. Whereas, 3-(3-morpholinopropoxy)-17-hydroxyimino-1,3,5(10)-estratriene caused an increase of 120% of uterine weight by subcutaneous injection in mice at dosage of 3 μg. per mouse.

The compounds of the invention are used both in the free base form or in the acid addition salt form. The acid addition salt is formed by reaction of the free base with an organic or inorganic acid in per se conventional manner. The acid addition salt can be converted to the corresponding free base by neutralization with a base. These conversions, especially conducting to acid addition salt form, make the isolation, purification, preservation, adsorption by administration, etc. more convenient, in many cases. The acid addition salts are preferred for uses in which increased water solubility is desired. As the organic or inorganic acid which can be used to produce the corresponding acid addition salt, a conventional acid, preferably a pharmacologically acceptable acid is used. For example, hydrochloric, hydrobromic, hydroiodic, sulfuric, phosphoric, nitric, formic, acetic, propionic, ethoxyformic, oxalic, lactic, succinic, tartaric and citric acid can be employed and sodium hemisuccinate, ammonium hemitartrate, sodium hemitartrate, mono- and di-sodium phosphates, mono- and di-sodium citrates, etc., are examples of additional salts.

The invention is illustrated by the following examples, wherein "g." stands for grams and "ml." stands for milliliters.

EXAMPLE 1

Each of N,N-dimethyl-2-chloroethylamine hydrochloride (5.7 g.) and 1.8097 N sodium ethoxide solution in ethanol (54.5 ml.) is divided into respective 6 parts which are added successively to a solution of 17-hydroxyimino-1,3,5(10)-estratrien-3-ol (2.8 g.) (Butenandt: Z. physiol. Chem., 199, 243 (1931) in 180 ml. of anhydrous ethanol within 30 minutes under heating and stirring. The resulting mixture is further reacted for 5 hours under heating and stirring, and then poured into ice-water, after which the resulting mixture is extracted with chloroform. The extract is washed with saturated aqueous sodium chloride solution, dried over anhydrous sodium sulfate, and concentrated under reduced pressure. The resulting oily residue (3.7 g.) is chromatographed on hydrated (3%) neutral alumina. Eluates with petroleum ether-benzene (9:1–4:1) affords 3-(2-dimethylaminoethoxy)-17-(2-dimethylaminoethoxy)imino - 1,3,5(10) - estratriene (708 mg.).

To a solution of the thus-obtained compound in 8 ml. of methanol, there is added a solution of oxalic acid dihydrate (840 mg.) in methanol (5 ml.) and the resulting mixture is concentrated under reduced pressure. The resulting crude product is recrystallized from methanol-ether to afford the corresponding oxalate (801 mg.) having M.P. 186–191.5° C. (decomp.).

Eluates, with petroleum ether-benzene (4:1) to chloroform containing methanol (2%), of the same chromatogram are recrystallized from dichloromethane-methanol to afford 3-(2-dimethylaminoethoxy)-17-hydroxyimino-1,3,5(10)-estratriene (205 mg.) having M.P. 165–173° C.

EXAMPLE 2

In the same manner as in Example 1, 32.4 g. of N,N-dimethyl-2-chloroethylamine hydrochloride and 11.5 g. of sodium ethoxide in ethanol (300 ml.) are added to 500 ml. of anhydrous ethanolic solution of 17-hydroxyimino-1,3,5(10)-estratrien-3-ol (16 g.) and the resulting mixture is further reacted for 2.5 hours under stirring and refluxing. The reaction mixture is, after standing at room temperature overnight, poured into ice-water and extracted with chloroform. The resulting extract (23 g.) is chromatographed on 500 g. of hydrated (3%) neutral alumina. Eluates, with petroleum ether-benzene (1:1) to benzene, are combined and crystallized from pentane or pentane-ethyl acetate to afford 3-(2-dimethylaminoethoxy)-17-(2-dimethylaminoethoxy)imino-1,3,5(10)-estratriene (5.7 g.) having M.P. 44–47° C. which affords amorphous hydrochloride by treatment with dry hydrogen chloride in anhydrous ether.

The mother liquor of the above crystallization is concentrated and the resulting amorphous residue (758 mg.) is dissolved in 4 ml. of methanol. The solution is, after addition of oxalic acid (dihydrate, 537 mg.) in methanol (2.5 ml.), concentrated under reduced pressure and the resulting crude product is crystallized from methanol to afford 617 mg. of the corresponding oxalate having M.P. 193–195° C. (decomp.) which affords free base, 3-(2-dimethylaminoethoxy)-17 - (2 - dimethylaminoethoxy) imino-1,3,5(10)-estratriene having M.P. 44–47° C., by treatment with sodium hydroxide.

Eluates, with benzene-chloroform (1:1) to chloroform, of the same chromatogram are crystallized from ethyl acetate, ether or ether-dichloromethane and recrystallized from methanol to afford 2.0 g. of 3-(2-dimethylaminoethoxy)-17-hydroxyimino-1,3,5(10) - estratriene having M.P. 165–170° C. which affords amorphous hydrochloride by treatment with dry hydrogen chloride in anhydrous ether.

EXAMPLE 3

To a solution of 1.0 g. of 17-hydroxyimino-1,3,5(10)-estratrien-3-ol in 30 ml. of anhydrous ethanol, there is added portionwise (7 portions) 3.85 g. of 1-morpholino-3-bromopropane hydrobromide and 35 ml. of 1.0 N sodium ethoxide at intervals of 30 minutes under heating and stirring. The reaction mixture is stirred for additional 2 hours and then poured into ice-water. The product is extracted with chloroform, washed with water, dried over anhydrous sodium sulfate, and evaporated in vacuo to yield 3.0 g. of residue. The residue is chromatographed on 30 g. of neutral alumina containing water (3%) and eluate with petroleum ether-benzene (1:4) is recrystallized from ether-petroleum ether to afford 3-(3-morpholinopropoxy)-17-(3-morpholinopropoxy)imino-1,3,5(10)-estratriene having M.P. 77–81° C. And eluate with benzene-chloroform (4:1) is recrystallized from ether to afford 3-(3-morpholinopropoxy)-17-hydroxyimino-1,3,5 (10)-estratriene having M.P. 172–178° C.

EXAMPLE 4

To a solution of 1.0 g. of 17-hydroxyimino-1,3,5(10)-estratrien-3-ol in 30 ml. of anhydrous ethanol, there is added portionwise (6 portions) 2.7 g. of 1-piperidino-3-bromopropane hydrobromide and 35 ml. of 1.0 N-sodium ethoxide at intervals of 30 minutes under heating and stirring. The reaction mixture is stirred for additional 3 hours and then poured into ice-water. The product is extracted with ether, washed with water, dried over anhydrous sodium sulfate, and evaporated in vacuo to yield 1.68 g. of residue. The residue is chromatographed on 30 g. of neutral alumina containing water (3%) and eluate with petroleum ether-benzene (1:4) is recrystallized from ether-petroleum ether to afford 3-(3-piperidinopropoxy)-17-(piperidinopropoxy)imino-1,3,5(10)-estratriene having M.P. 85–87° C. And eluate with benzene-chloroform (3:2) is recrystallized from ether to afford 3-(3-piperidinopropoxy)-17-hydroxyimino-1,3,5(10)-estratriene having M.P. 157–161° C.

EXAMPLE 5

In the same manner as in the above examples, N,N-diethyl-2-chloroethylamine hydrochloride, pyrrolidinoethyl chloride hydrochloride, piperidinoethyl chloride hydrochloride and morpholinoethyl chloride hydrochloride are allowed to react respectively with 17-hydroxyimino-1,3,5(10)-estratrien-3-ol in the presence of sodium ethoxide to afford respective products, 3-(2-diethylaminoethoxy)-17-(2-diethylaminoethoxy)imino-1,3,5(10)-estratriene, 3-(2-diethylaminoethoxy)-17-hydroxyimino-1,3,5(10) - estratriene, 3-(2-pyrrolidinoethoxy) - 17 - (2-pyrrolidinoethoxy)imino-1,3,5(10)-estratriene, 3 - (2-pyrrolidinoethoxy)-17-hydroxyimino-1,3,5(10)-estratriene, 3-(2-piperidinoethoxy)-17-(2-piperidinoethoxy)-1,3,5(10) - estratriene, 3-(2-piperidinoethoxy - 17 - hydroxyimino-1,3,5(10)-estratriene, 3 - (2 - morpholinoethoxy)-17-(2-morpholinoethoxy)imino-1,3,5(10)-estratriene and 3 - (2-morpholinoethoxy)-17-hydroxyimino-1,3,5(10) - estratriene, which can be converted to the corresponding hydrochlorides and oxalates.

EXAMPLE 6

In a similar manner to the above examples, 3-(2-dimethylaminoethoxy)-17-(2)-dimethylaminoethoxy)imino-1,3,5(10-estratriene and 3-(2-dimethylaminoethoxy)-17-hydroxyimino-1,3,5(10)-estratriene are prepared from 17-hydroxyimino-1,3,5(10)-estratrien-3-ol by the action of dimethylaminoethyl bromide, dimethylaminoethyl iodide, dimethylaminoethyl methane-sulfonate or dimethylaminoethyl p-toluenesulfonate in the presence of sodium methoxide, sodium ethoxide, potassium methoxide or potassium ethoxide.

The products, 3-(2-dimethylaminoethoxy) - 17 - (2-dimethylaminoethoxy)imino-1,3,5(10)-estratriene and 3-(2-dimethylaminoethoxy) - 17 - hydroxyimino-1,3,5(10)-estratriene, are readily converted to the corresponding hydrobromides, hydroiodides, sulfates, nitrates, formates, acetates, propionates, ethoxyformates, succinates, sodium hemisuccinates and phosphates.

What we claim is:

1. A compound selected from the group consisting of compounds of the formula

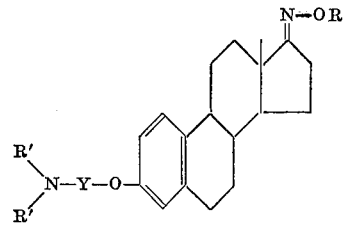

and pharmaceutically acceptable acid addition salts thereof, wherein each R' independently is a member selected from the group consisting of methyl and ethyl or

is a member selected from the group consisting of pyrrolidino, piperidino and morpholino, Y is a member selected from the group consisting of ethylene and trimethylene, and R represents a hydrogen atom or the group;

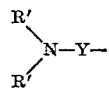

wherein R' and Y respectively have the same significance as defined above.

2. A compound according to claim 1, namely 3-(2-dimethylaminoethoxy-17 - (2 - dimethylaminoethoxy)imino-1,3,5(10)-estratriene.

3. A compound according to claim 1, namely 3-(2-diethylaminoethoxy)-17-(2-diethylaminoethoxy)imino - 1,3,5(10)-estratriene.

4. A compound according to claim 1, namely 3-(2-pyrrolidinoethoxy) - 17-(2-pyrrolidinoethoxy)imino-1,3,5(10)-estratriene.

5. A compound according to claim 1, namely 3-(2-piperidinoethoxy)-17 - (2 - piperidinoethoxy)imino - 1,3,5 (10)-estratriene.

6. A compound according to claim 1, namely 3-(2-morpholinoethoxy) - 17 - (2 - morpholinoethoxy)imino - 1,3,5 (10)-estratriene.

7. A compound according to claim 1, namely 3-(3-morpholinopropoxy)-17-(3-morpholinopropoxy)imino - 1,3,5 (10)-estratriene.

8. A compound according to claim 1, namely 3-(3-piperidinopropoxy-17-(3 - piperidinopropoxy)imino - 1,3,5 (10)-estratriene.

9. A compound according to claim 1, namely 3-(2-dimethylaminoethoxy)-17-hydroxyimino - 1,3,5(10) - estratriene.

10. A compound according to claim 1, namely 3-(2-diethylaminoethoxy)-17-hydroxyimino - 1,3,5(10) - estratriene.

11. A compound according to claim 1, namely 3-(3-morpholinopropoxy)-17-hydroxyimino - 1,3,5(10) - estratriene.

12. A compound according to claim 1, namely 3-(3-piperidinopropoxy)-17-hydroxyimino - 1,3,5(10) - estratriene.

13. A compound according to claim 1, namely acid addition salt of 3-(2-dimethylaminoethoxy)-17-(2-dimethylaminoethoxy)imino-1,3,5(10)-estratriene.

14. A compound according to claim 1, namely acid addition salt of 3-(2-diethylaminoethoxy)-17-(2-diethylaminoethoxy)imino-1,3,5(10)-estratriene.

15. A compound according to claim 1, namely acid addition salt of 3-(2-pyrrolidinoethoxy)-17-(2-pyrrolidinoethoxy)imino-1,3,5(10)-estratriene.

16. A compound according to claim 1, namely acid addition salt of 3-(2-piperidinoethoxy)-17-(2-piperidinoethoxy)imino-1,3,5(10)-estratriene.

17. A compound according to claim 1, namely acid addition salt of 3-(2-morpholinoethoxy)- 17-(2 - morpholinoethoxy)imino-1,3,5(10)-estratriene.

18. A compound according to claim 1, namely acid addition salt of 3 - (3-morpholinopropoxy) - 17-(3-morpholinopropoxy)imino-1,3,5(10)-estratriene.

19. A compound according to claim 1, namely acid addition salt of 3-(piperidinoethoxy)-17-(3-piperidinoethoxy)imino-1,3,5(10)-estratriene.

20. A compound according to claim 1, namely acid addition salt of 3 - (2-dimethylaminoethoxy)-17-hydroxyimino-1,3,5(10)-estratriene.

21. A compound according to claim 1, namely acid addition salt of 3-(2-diethylaminoethoxy)-17-hydroxyimino-1,3,5(10)-estratriene.

22. A compound according to claim 1, namely acid addition salt of 3-(3-morpholinopropoxy)-17-hydroxyimino-1,3,5(10)-estratriene.

23. A compound according to claim 1, namely acid addition salt of 3 - (3 - piperidinopropoxy) - 17 - hydroxyimino-1,3,5(10)-estratriene.

References Cited

UNITED STATES PATENTS

| | | | |
|---|---|---|---|
| 3,000,910 | 9/1961 | Birkenmeyer et al. | 260—397 |
| 3,271,428 | 9/1966 | Villani et al. | 260—397.5 |
| 3,328,387 | 6/1967 | Meyer et al. | 260—211 |

LEWIS GOTTS, Primary Examiner

E. G. LOVE, Assistant Examiner

U.S. Cl. X.R.

260—239.55, 397.5; 424—238, 241